United States Patent
Farouz-Fouquet

(10) Patent No.: US 11,052,995 B2
(45) Date of Patent: Jul. 6, 2021

(54) AIRPLANE WITH CONFIGURATION CHANGING IN FLIGHT

(71) Applicant: Airbus Operations SAS, Toulouse (FR)

(72) Inventor: Mathias Farouz-Fouquet, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 265 days.

(21) Appl. No.: 16/215,833

(22) Filed: Dec. 11, 2018

(65) Prior Publication Data

US 2019/0185173 A1  Jun. 20, 2019

(30) Foreign Application Priority Data

Dec. 19, 2017  (FR) .................... 1762408

(51) Int. Cl.
| | |
|---|---|
| *B64C 17/10* | (2006.01) |
| *B64D 37/14* | (2006.01) |
| *B64D 37/06* | (2006.01) |
| *B64C 5/10* | (2006.01) |
| *B64C 5/02* | (2006.01) |
| *B64D 37/04* | (2006.01) |
| *B64C 3/34* | (2006.01) |
| *B64C 5/18* | (2006.01) |

(52) U.S. Cl.
CPC ............... *B64C 17/10* (2013.01); *B64C 3/34* (2013.01); *B64C 5/02* (2013.01); *B64C 5/10* (2013.01); *B64C 5/18* (2013.01); *B64D 37/04* (2013.01); *B64D 37/06* (2013.01); *B64D 37/14* (2013.01)

(58) Field of Classification Search
CPC .. B64C 17/10; B64C 5/10; B64C 5/18; B64C 3/546

See application file for complete search history.

(56) References Cited

U.S. PATENT DOCUMENTS

| | | |
|---|---|---|
| 2005/0236520 A1 | 10/2005 | Wukowitz |
| 2010/0044515 A1 | 2/2010 | Neto |
| 2012/0298795 A1 | 11/2012 | Cazals et al. |
| 2016/0375985 A1 | 12/2016 | Ribarov et al. |

OTHER PUBLICATIONS

French Search Report; priority document.

*Primary Examiner* — Assres H Woldemaryam
(74) *Attorney, Agent, or Firm* — Greer, Burns & Crain, Ltd.

(57) ABSTRACT

An airplane comprises a fuselage, two wings, engines, a rear tail unit comprising a horizontal tail provided with two tail ends, a first and a second set of fuel tanks, and a fuel transfer system configured to be able to transfer, at least in flight, fuel from one to the other of the first and second sets of fuel tanks, the tail ends being, in addition, mounted so as to be able to be pivoted, at least in flight, relative to the horizontal tail, the airplane thus having a configuration changeable in flight.

10 Claims, 3 Drawing Sheets

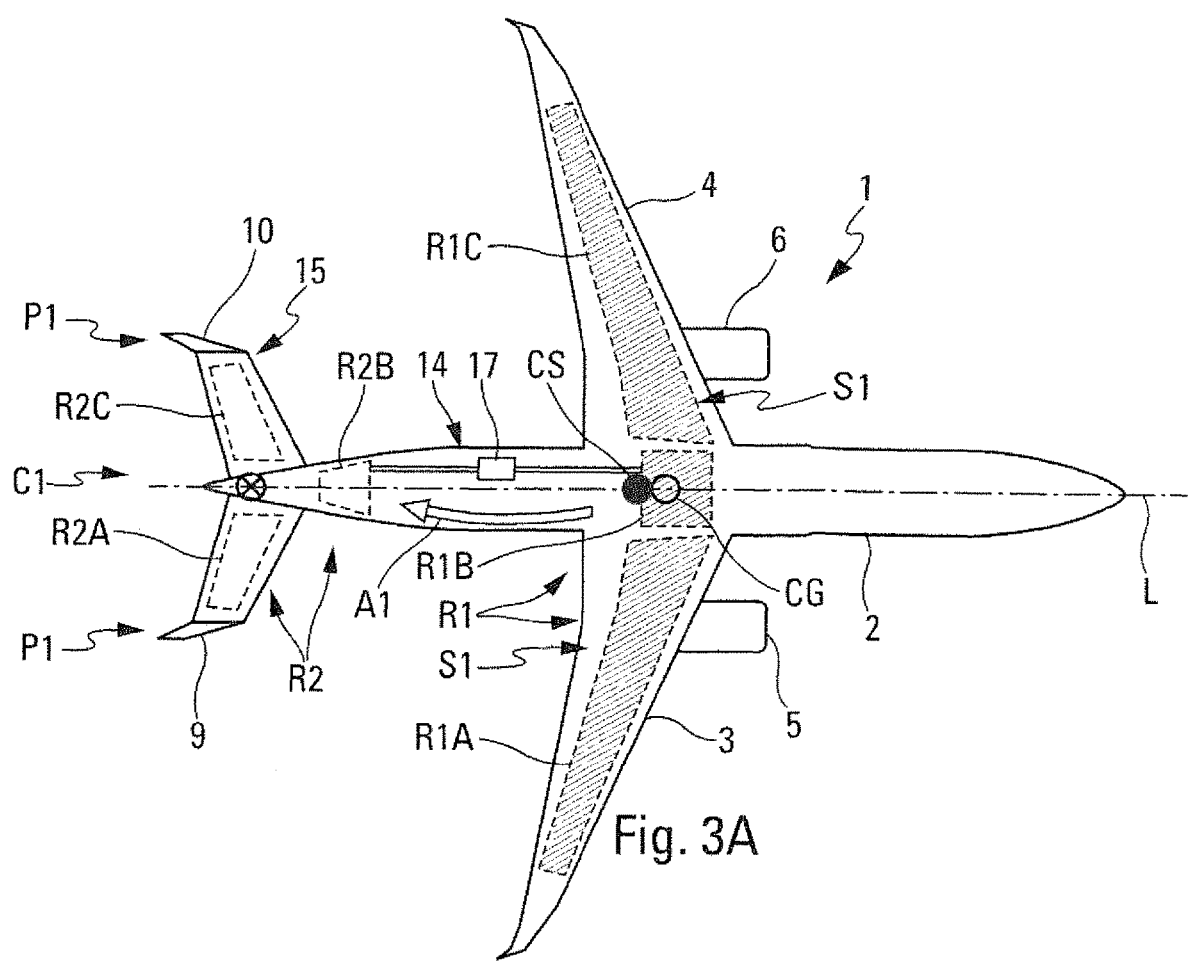
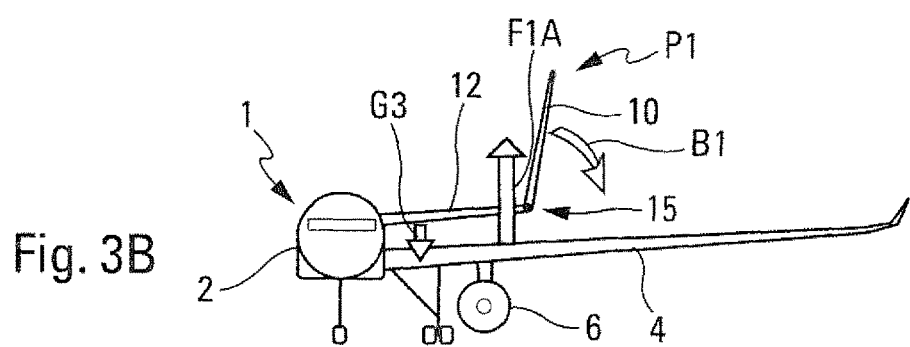
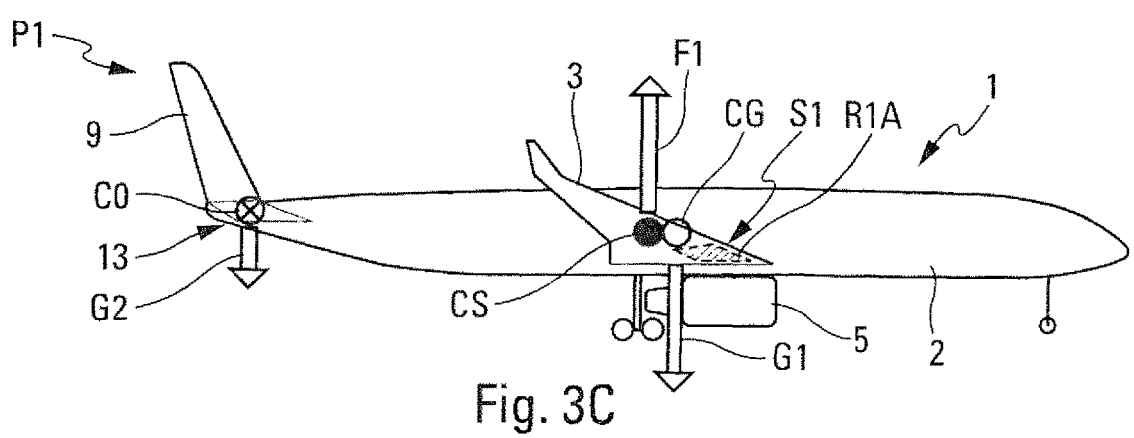
Fig. 3A
Fig. 3B
Fig. 3C

AIRPLANE WITH CONFIGURATION CHANGING IN FLIGHT

CROSS-REFERENCES TO RELATED APPLICATIONS

This application claims the benefit of the French patent application No. 1762408 filed on Dec. 19, 2017, the entire disclosures of which are incorporated herein by way of reference.

FIELD OF THE INVENTION

The present invention relates to an airplane with aerodynamic configuration changing in flight.

BACKGROUND OF THE INVENTION

The present invention relates to an airplane, in particular, a transport airplane, which comprises, in particular, a fuselage, two wings, at least two engines arranged on either side of a vertical plane of symmetry of the airplane, and rear tail units, horizontal and vertical, implementing standard functions of stability and of control of the altitude and of the trajectory of the airplane.

It is known that, in general, the horizontal tail of an airplane comprises a fixed part and a mobile part representing an elevator, and the vertical tail comprises a fixed part and a mobile part representing a rudder.

Such a standard architecture of an airplane with rear tail units (horizontal and vertical), has drawbacks. In particular:

in cruising flight of the airplane, the rear vertical tail contributes little to the aerodynamics of the airplane and adds weight and drag for no aerodynamic, economic or safety advantage. This rear vertical tail is used, primarily, during the take-off and landing phases, when rapid changes in direction can occur. It is also very important when an engine stops suddenly during take-off. The rudder is then activated by the pilot to act against the thrust imbalance. Consequently, the rear vertical tail is used only for short periods of time during the flight, although it has a significant surface area, generally of the order of 10% of the wing surface area; and the purpose of the rear horizontal tail is to counteract both the natural pitch of Ernst moment of the wings, and the position of the center of gravity located forward of the center of lift of the wings. The rear horizontal plane exerts a downward force to keep the airplane stable and in balance during a flight. The result of this is a loss of both aerodynamic and economic efficiency. The rear horizontal tail does not participate in the lift of the airplane. On the contrary, it degrades it by approximately 5%, while representing 15% to 20% of the wing surface area.

The configuration of such an airplane, which is fixed, is not therefore optimal in all the flight phases.

In the context of the present invention, the configuration of the airplane depends in particular on the characteristics of the rear tail unit and on the position of the center of gravity of the airplane.

SUMMARY OF THE INVENTION

An object of the present invention is to remedy this drawback. To do this, it relates to an airplane, in particular, a transport airplane which has a longitudinal axis, and which comprises at least a fuselage, two wings, engines, a rear tail unit comprising a horizontal tail provided with two tail ends, and at least a first set of fuel tanks.

According to the invention, the airplane comprises at least one second set of fuel tanks, offset relative to the first set of fuel tanks at least along the longitudinal axis, and at least one fuel transfer system configured to be able to transfer, at least in flight, fuel from one to the other of the first and second sets of fuel tanks, and the tail ends are mounted so as to be able to be pivoted, at least in flight, relative to the horizontal tail.

Thus, by virtue of the capacity to both displace fuel longitudinally (between the two sets of fuel tanks) and to pivot the tail ends, during a flight, there is a possibility of changing the configuration of the airplane in flight. As specified below, this makes it possible, in particular, to adapt the configuration of the airplane to the current flight phase, in order to exploit the various elements of the rear tail unit (and to do so in differentiated ways) during the various flight phases.

Advantageously, the fuel transfer system is capable of being controlled and it is configured to be able to bring, at least in flight, fuel from one to the other of the first and second sets of fuel tanks in order to obtain, alternately, one or other of the following two filling states:

a first filling state, in which the center of gravity of the airplane is situated towards the front of the airplane relative to the center of lift (of the wings); and a second filling state, in which the center of gravity of the airplane is situated towards the rear of the airplane relative to the center of lift.

Furthermore, advantageously, the airplane also comprises at least one pivoting mechanism capable of being controlled and configured to be able to bring each of the two tail ends, at least in flight, alternately into one or other of the following two stable positions:

a first, so-called folded position, in which the two tail ends are arranged substantially orthogonally to a general plane of the horizontal tail so as to form a vertical tail; and a second, so-called deployed position, in which the two tail ends are arranged substantially in the general plane of the horizontal tail so as to form, with the horizontal tail, an augmented horizontal tail surface.

In the context of the present invention, the fuel transfer system and the pivoting mechanism can be produced in different ways.

Advantageously, the fuel transfer system comprises at least one pumping device.

Advantageously, the first set of fuel tanks comprises:

at least one fuel tank arranged in one of the wings of the airplane; and at least one fuel tank arranged in the other of the wings of the airplane.

Furthermore, in addition or as a variant, advantageously, the first set of fuel tanks comprises at least one fuel tank arranged in the fuselage of the airplane, longitudinally at the root of the wings on the fuselage.

Moreover, advantageously, the horizontal tail includes two tail parts arranged on either side of a vertical axis of symmetry of the airplane, and the second set of fuel tanks comprises:

at least one fuel tank arranged in one of the tail parts of the horizontal tail; and at least one fuel tank arranged in the other of the tail parts of the horizontal tail.

Furthermore, in addition or as a variant, advantageously, the second set of fuel tanks comprises at least one tank arranged in the fuselage of the airplane, longitudinally at the front end of the rear tail unit of the airplane.

The present invention relates also to a method for modifying in flight a configuration of an airplane, the airplane comprising at least a fuselage, two wings, engines, a rear tail unit comprising a horizontal tail provided with two tail ends, and at least first and second sets of fuel tanks, and at least one fuel transfer system configured to be able to transfer fuel from one to the other of the first and second sets of fuel tanks, the tail ends being mounted so as to be able to be pivoted relative to the horizontal tail.

According to the invention, the method for modifying the configuration of the airplane comprises:

at least a first step comprising, on the one hand, transferring fuel so as to bring the first and second sets of fuel tanks into a first filling state in which the center of gravity of the airplane is situated towards the front of the airplane relative to the center of lift, and, on the other hand, bringing the tail ends into a so-called folded position in which the tail ends are arranged substantially orthogonally to a general plane of the horizontal tail; and at least a second step comprising, on the one hand, transferring fuel so as to bring the first and second sets of fuel tanks into a second filling state, in which the center of gravity of the airplane is situated towards the rear of the airplane relative to the center of lift, and, on the other hand, bringing the tail ends into a so-called deployed position in which the tail ends are arranged substantially in the general plane of the horizontal tail, the first and second steps being implemented at least during a flight of the airplane.

Advantageously, the first step is implemented, at least, during a take-off phase of the airplane and/or during a landing phase of the airplane, and the second step is implemented, at least, during a cruising flight phase of the airplane.

Thus:

during the take-off and landing phases, the configuration of the airplane is conventional, with the tail ends arranged vertically at the ends of the horizontal tail. Furthermore, since, through the filling state generated, the center of gravity of the airplane is situated forward of the center of lift, the (rear) horizontal tail exerts a downward force to keep all of the airplane in balance;

during the cruising flight phase or phases, the filling state of the first and second sets of fuel tanks is modified so as to cause a rearward displacement of the center of gravity, which is then located aft of the main center of lift of the airplane. The horizontal tail and the tail ends (brought into the deployed position) become a lift surface and participate in the lift of the airplane.

BRIEF DESCRIPTION OF THE DRAWINGS

The attached figures will give a good understanding of how the invention can be produced. In these figures, identical references denote similar elements. More particularly:

FIGS. 3A, 3B and 3C schematically illustrate plan views of the airplane in the configuration of FIG. 1, respectively seen from above, by partial front view, and by lateral view;

DETAILED DESCRIPTION OF THE PREFERRED EMBODIMENTS

Figure 1:
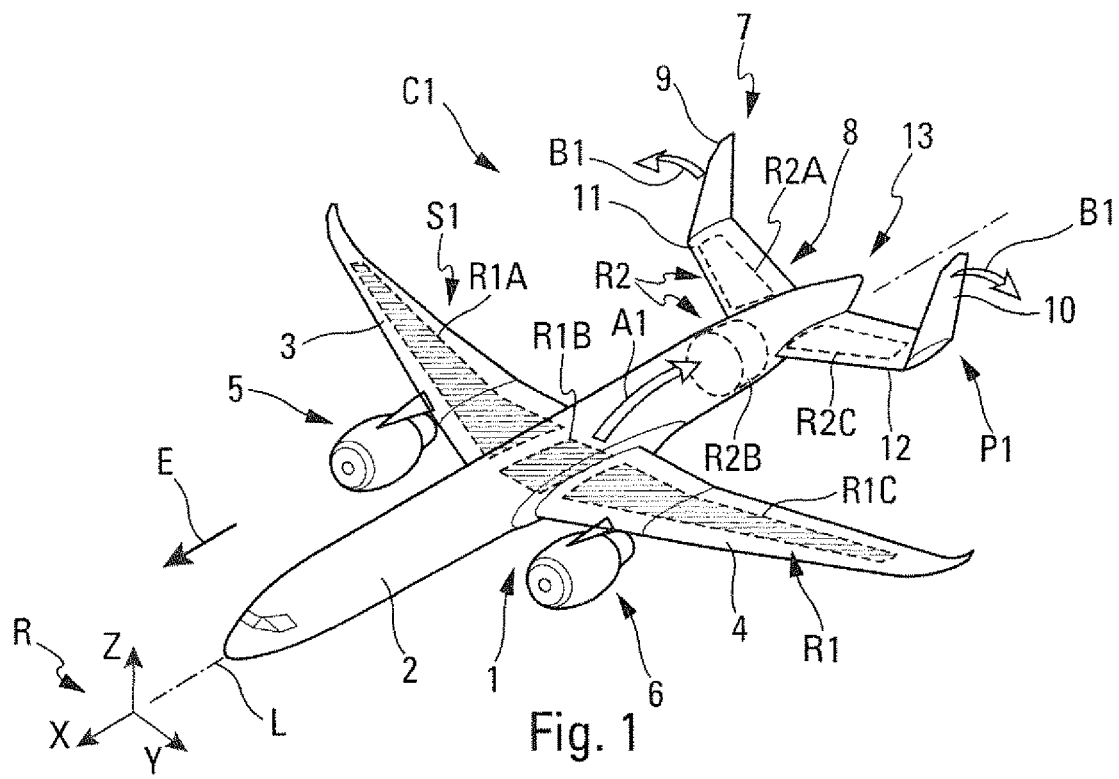
FIG. 1 is a perspective schematic view of an airplane in a first configuration.
Figure 2:
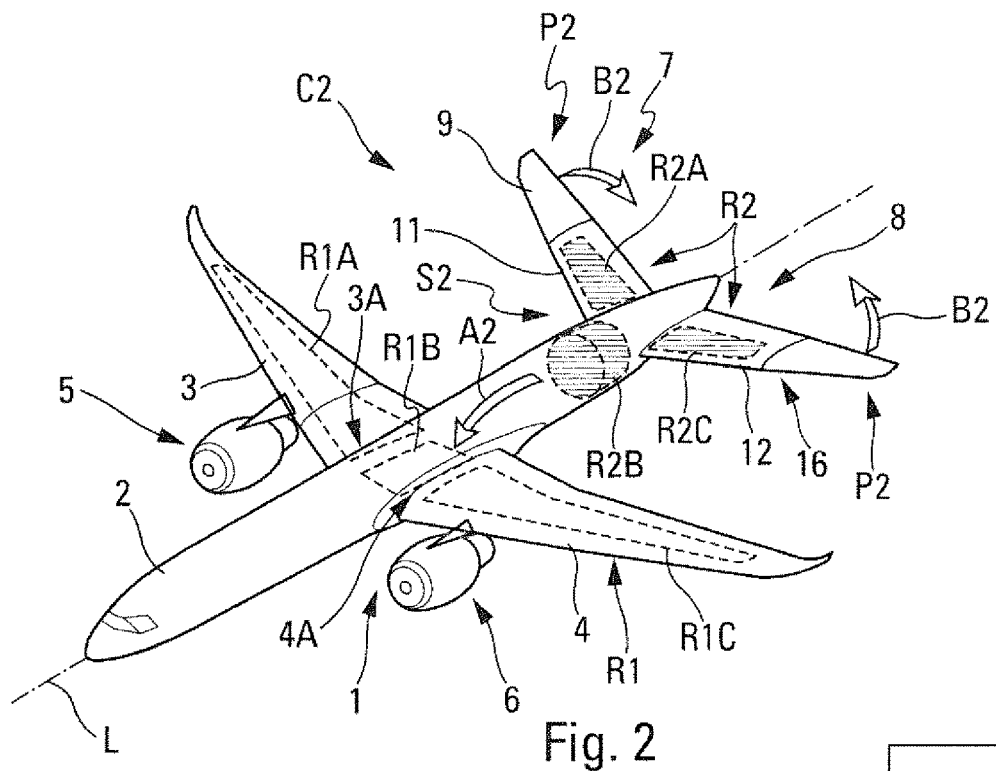
FIG. 2 is a perspective schematic view of an airplane in a second configuration.

FIGS. 1 and 2 show an airplane 1, for example a transport airplane, having a longitudinal axis L, which is represented schematically in a particular embodiment.

To simplify the description, FIG. 1 shows a standard airplane reference frame R, comprising three main directions, namely:

a so-called longitudinal direction X, parallel to the longitudinal axis L of the airplane 1;

a so-called vertical direction Z, at right angles to the longitudinal direction X, the plane XZ forming a vertical plane of symmetry of the airplane 1; and a so-called lateral direction Y, at right angles to the plane XZ.

FIG. 1 also shows a direction E of flight of the airplane 1. In the following description, the terms "front" and "rear" are defined relative to the direction E (that is to say, towards the front or towards the rear of the airplane 1). Similarly, the terms "up" and "down" are defined relative to the direction illustrated by the arrow Z (that is to say, upwards or downwards from the airplane 1).

This airplane 1 comprises, as represented, in particular, in FIGS. 1 and 2:

an elongate fuselage 2, of longitudinal axis corresponding to the longitudinal axis L;

two wings 3 and 4 fixed onto the fuselage 2, on either side of the fuselage 2 at roots 3A and 4A;

at least two engines 5 and 6 arranged respectively under the wings 3 and 4 on either side of the vertical plane of symmetry XZ of the airplane 1. "Engine" 5, 6 is understood, each time, to mean the assembly formed by the engine members and an associated nacelle if appropriate; and a rear tail unit 7 comprising a horizontal tail 8 provided with two tail ends 9 and 10.

In the example represented in FIG. 1, the horizontal tail 8 is formed by two tail parts 11 and 12, of generally substantially planar form, which are fixed on either side of the fuselage 2 in proximity to the tail 13 of the airplane 1. The tail ends 9 and 10 are arranged, respectively, at the free ends of the tail parts 11 and 12. The tail ends 9 and 10 represent surfaces of generally substantially planar form. The tail parts 11 and 12 and the tail ends 9 and 10 can be provided with standard control surfaces (not represented).

The airplane 1 also comprises a first set R1 of fuel tanks, specified hereinbelow.

Figure 4A:
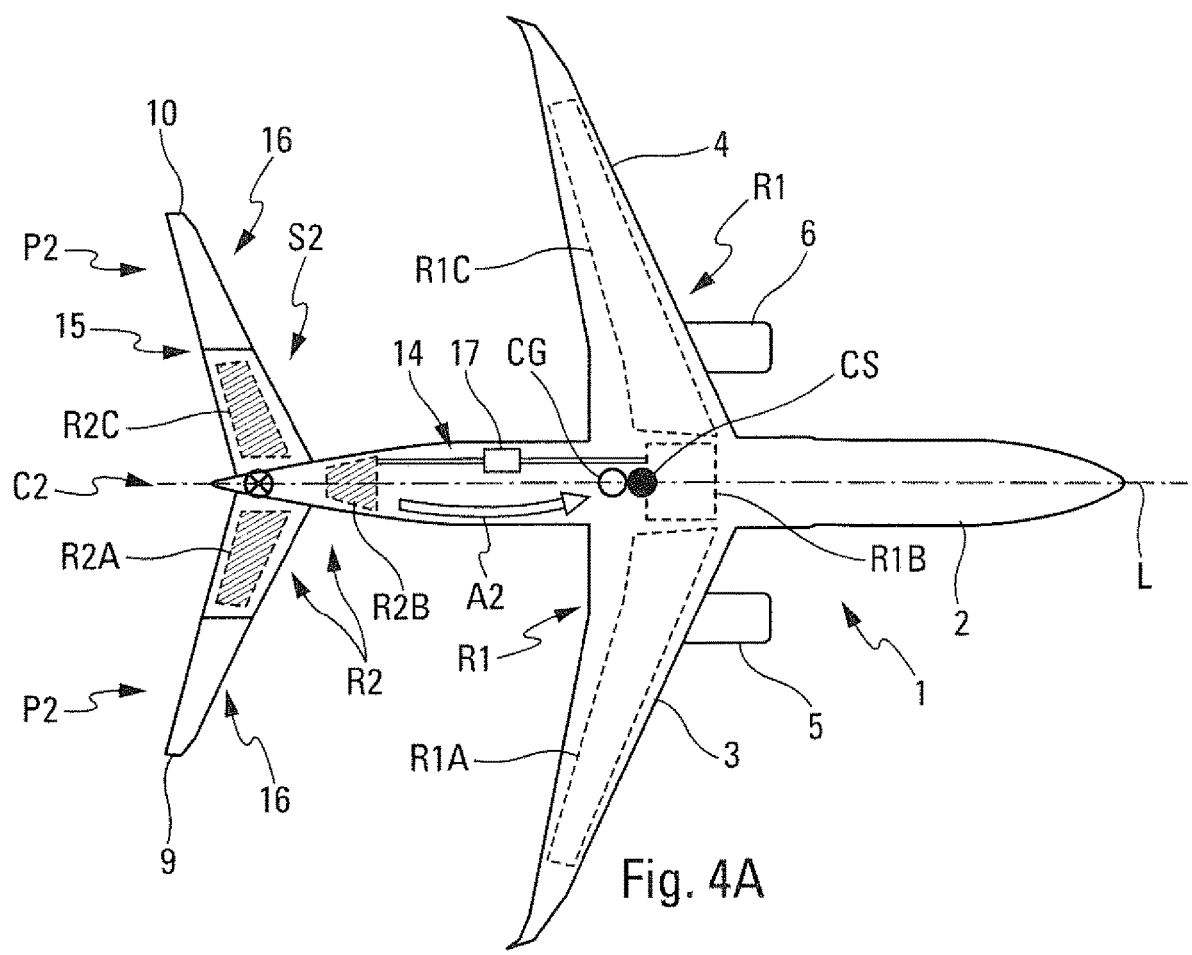
FIGS. 4A, 4B and 4C schematically illustrate plan views of the airplane in the configuration of FIG. 2, respectively seen from above, by partial front view, and by lateral view.

According to the invention, and as specified hereinbelow:

the airplane 1 also comprises a second set R2 of fuel tanks, offset relative to the first set R1 of fuel tanks at least along the longitudinal axis L, and at least one fuel transfer system 14 (FIGS. 3A and 4A). This fuel transfer system 14 is configured to be able to transfer, at least during a flight of the airplane 1, fuel from one to the other of the first and second sets R1 and R2 of fuel tanks; and the tail ends 9 and 10 are mounted so as to be able to be pivoted, also at least during a flight of the airplane 1, relative to the tail parts 11 and 12 of the horizontal tail 8.

In a particular embodiment, as represented in particular in FIGS. 1, 2, 3A and 4A, the set R1 comprises:

a fuel tank R1A arranged in the wing 3 (right, in the direction E of flight) of the airplane 1;

a fuel tank R1C arranged in the wing 4 (left, in the direction E of flight) of the airplane 1; and a fuel tank R1B arranged in the fuselage 2 of the airplane 1, longitudinally (that is to say, along the longitudinal axis L) substantially at the roots 3A and 4A (FIG. 2) of the wings 3 and 4 on the fuselage 2.

Preferably, the fuel tanks R1A and R1C are arranged substantially symmetrically relative to the vertical plane XZ of symmetry of the airplane 1.

Furthermore, in a particular embodiment, as represented also in FIGS. 1, 2, 3A and 4A, the set R2 comprises:

a fuel tank R2A arranged in the tail part 11 (right, in the direction E of flight) of the horizontal tail 8;

a fuel tank R2C arranged in the tail part 12 (left, in the direction E of flight) of the horizontal tail 8; and a tank R2B arranged in the fuselage 2 of the airplane 1, towards the rear of the airplane 1, longitudinally substantially at the front end of the rear tail unit 7 of the airplane 1.

Preferably, the fuel tanks R2A and R2C are arranged substantially symmetrically relative to the vertical plane XZ of symmetry of the airplane 1.

The fuel tanks R1A, R1B and R1C of the set R1 are arranged (longitudinally) towards the front on the airplane 1, relative to the fuel tanks R2A, R2B and R2C of the set R2.

The fuel transfer system 14 (FIGS. 3A and 4A) is configured to be able to bring, at least in flight, fuel from one to the other of the sets R1 and R2 of fuel tanks in order to obtain, alternately, one or other of the two filling states S1, S2. The fuel transfer system 14 is capable of being controlled, for example by a command received from a pilot of the airplane or by a command received from an automatic piloting system of the airplane.

At a given instant, in the filling state S1, the set R1 (namely, at least some of the fuel tanks R1A, R1B and R1C) contains more fuel than in the filling state S2. Conversely, at a given instant, in the filling state S1, the set R2 (namely at least some of the fuel tanks R2A, R2B and R2C) contains less fuel than in the filling state S2. In a particular embodiment, the fuel tanks R2A, R2B and R2C can be completely empty in the filling state S1.

The state in which some of the fuel tanks R1A, R1B, R1C, R2A, R2B and R2C are filled with fuel is illustrated by shading in FIGS. 1, 2, 3A, and 4A, in particular.

The filling state S1 (which corresponds to a first given distribution of the fuel between the sets R1 and R2) is such that the center of gravity CG of the airplane 1 is situated towards the front of the airplane 1 relative to the center of lift CS (representing the point of application of the lift generated by the wings 3 and 4), as represented in FIGS. 3A and 3C. FIG. 3C shows an arrow F1 illustrating the lift generated by the wings 3 and 4 of the airplane 1, which is directed from the center of lift CS of the airplane 1 upwards. Also represented in this FIG. 3C is an arrow G1 illustrating the weight generated by the mass of the airplane 1, which is directed from the center of gravity CG of the airplane 1 downwards.

Figure 4B:
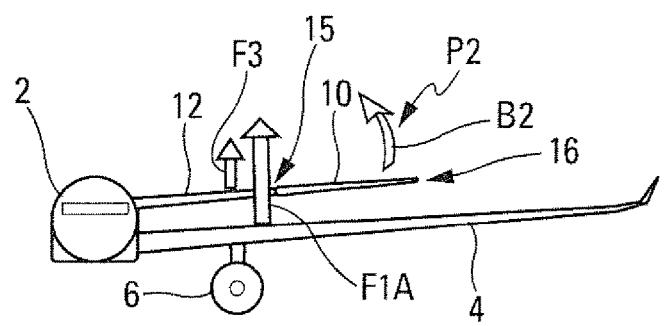
Figure 4C:
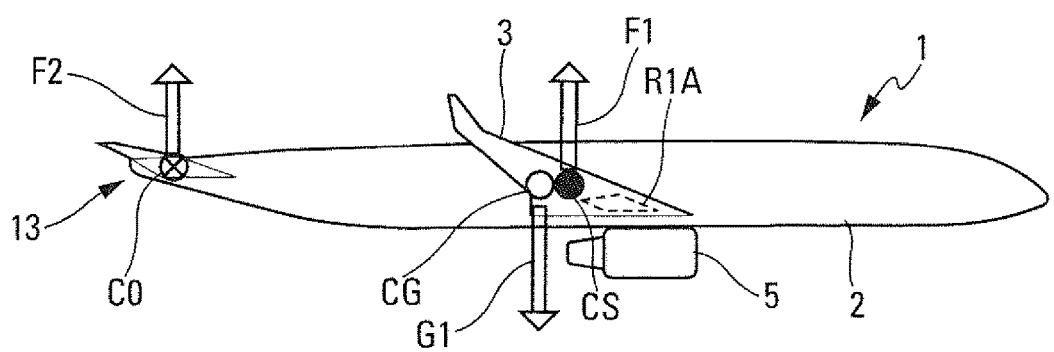

As for the filling state S2 (which corresponds to a second given distribution of the fuel between the sets R1 and R2), it is such that the center of gravity CG of the airplane 1 is situated towards the rear of the airplane 1 relative to the center of lift CS, as represented in FIGS. 4A and 4C.

Moreover, the airplane 1 also comprises a pivoting mechanism 15 (FIGS. 3A, 4A and 4B). This pivoting mechanism 15 is capable of being controlled, for example by a command received from a pilot of the airplane or by a command received from an automatic piloting system of the airplane.

The pivoting mechanism 15 is configured to be able to bring both of the two tail ends 9 and 10, during a flight of the airplane 1 and also on the ground, alternately into one or other of the two stable positions P1 and P2.

The so-called folded position P1, is such that the two tail ends 9 and 10 are arranged substantially orthogonally to a general plane formed by the horizontal tail 8 (or its two tail parts 11 and 12), as represented in FIG. 1 and FIGS. 3A to 3C. This general plane can be substantially parallel to a plane XY. In this folded position P1, the two tail ends 9 and 10, of generally planar form, are substantially parallel to the plane XZ. In this folded position P1, the two tail ends 9 and 10 thus form, together, a rear vertical tail and they are capable of fulfilling the standard functions of a vertical airplane tail. In this folded position P1, the rear tail unit 7 therefore comprises a horizontal tail 8 and a vertical tail formed by the tail ends 9 and 10.

Furthermore, the so-called deployed position P2 is such that the two tail ends 9 and 10 are arranged substantially in the general plane formed by the horizontal tail 8 (or its two tail parts 11 and 12), as represented in FIG. 2 and FIGS. 4A to 4C. In this deployed position P1, the two tail ends 9 and 10 form, with the horizontal tail 8, an augmented horizontal tail surface 16. By virtue of this augmented horizontal tail surface 16, the airplane 1 has an overall greater and therefore more effective surface for implementing the standard functions of a horizontal airplane tail and above all for participating in the lift, as specified hereinbelow.

In the example of FIGS. 1 and 3A to 3C, the airplane 1 is in a first configuration C1, in which the sets R1 and R2 are in the filling state S1 and the tail ends 9 and 10 are in the folded position P1.

This configuration C1 of the airplane, which is conventional, is used preferably during the take-off and landing phases of the airplane 1, as specified hereinbelow. The center of gravity CG is situated forward of the center of lift CS, and the horizontal tail 8 exerts a downward force, as illustrated by an arrow G2 in FIG. 3C from a point of application C0 situated at the tail 13 of the airplane 1 (or as shown by an arrow G3 for the tail part 12 in FIG. 3B) to keep all of the airplane 1 in balance. The balance is obtained by the combination of the different forces illustrated by the arrows G1, G2 and F1. The arrow F1A in FIG. 3B shows the lift generated by the wing 4.

Moreover, in the example of FIGS. 2 and 4A to 4C, the airplane 1 is in a second configuration C2, in which the sets R1 and R2 are in the filling state S2 and the tail ends 9 and 10 are in the deployed position P2.

This configuration C2 of the airplane 1 is used, preferably, during a cruising flight. The yaw stability is not as critical during the cruising phases as in the take-off and landing phases. The airplane can also comprise mobile control surfaces (not represented) arranged on the wings 3 and 4 and/or on the rear tail unit 7, to automatically perform an additional yaw correction.

In this configuration C2, the center of gravity CG is situated aft of the center of lift CS, and the horizontal tail 8 exerts an upward force, as illustrated by an arrow F2 in FIG. 4C from the point of application C0 situated at the tail 13 of the airplane 1 (or as shown by an arrow F3 for the tail part 12 in FIG. 4B) to add an additional lift, and to do so using an enlarged surface area (namely the enlarged horizontal tail surface 16).

In the context of the present invention, the fuel transfer system 14 and the pivoting mechanism 15 can be produced in different ways, making it possible to implement the transfer and pivoting functions.

In a preferred embodiment, the fuel transfer system 14 comprises a pumping device 17 represented schematically in FIGS. 3A and 4A.

In the example represented in the figures, the engines 5 and 6 are arranged under the wings 3 and 4 of the airplane 1. As a variant (not represented), the engines can also be arranged on the fuselage 2 of the airplane 1.

The present invention applies equally to an airplane whose engines 5 and 6 are turbojet engines or turboprop engines, as represented schematically in the examples of FIGS. 1 to 4C, and to an airplane (not represented) whose engines are propfan engines or open rotor engines, with a simple propulsion or counter-rotational propulsion on each pylon/engine assembly.

The present invention relates also to a method for modifying the configuration of an airplane 1 such as that described above.

Figure 5:
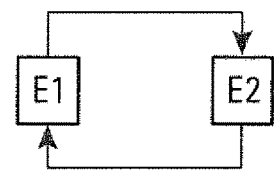
FIG. 5 is the block diagram of a method for modifying the configuration of an airplane.

This method comprises, as represented in FIG. 5:

a step E1 comprising bringing the airplane 1 into the configuration C1 (FIGS. 1 and 3A to 3C). To do this, this step E1 comprises:

on the one hand, transferring, if necessary, fuel from the set R2 to the set R1 so as to bring the sets R1 and R2 into the filling state S1 represented in FIGS. 1 and 3A to 3C, using the fuel transfer system 14, and to do so from the filling state S2 represented in FIGS. 2 and 4A to 4C, by performing a transfer of fuel in the direction illustrated schematically by an arrow A2 in FIGS. 2 and 4A. During the take-off of the airplane, the sets R1 and R2 can be initially in the filling state S1, with the tanks R2A, R2B and R2C empty; and on the other hand, bringing the tail ends 9 and 10 into the folded position P1 represented in FIGS. 1 and 3A to 3C, using the pivoting mechanism 15, from the deployed position P2 represented in FIGS. 2 and 4A to 4C, in the direction illustrated by arrows B2 in FIGS. 2 and 4B;

a step E2 comprising bringing the airplane 1 into the configuration C2 (FIGS. 2 and 4A to 4C). To do this, this step E2 comprises:

on the one hand, transferring fuel from the set R1 to the set R2 so as to bring the sets R1 and R2 into the filling state S2 represented in FIGS. 2 and 4A to 4C, using the fuel transfer system 14, and to do so from the filling state S1 represented in FIGS. 1 and 3A to 3C, by performing a transfer of fuel in the direction illustrated schematically by an arrow A1 in FIGS. 1 and 3A; and on the other hand, bringing the tail ends 9 and 10 into the deployed position P2 represented in FIGS. 2 and 4A to 4C, using the pivoting mechanism 15, from the folded position P1 represented in FIGS. 1 and 3A to 3C, in the direction illustrated by arrows B1 in FIGS. 1 and 3B.

The steps E1 and E2 are implemented, alternately, during a flight of the airplane 1. The transition from one to the other of these steps E1 and E2, for changing the configuration of the airplane 1, can be controlled and performed several times during one and the same flight. The command to modify the configuration (or to activate one or other of the steps E1 and E2), can be generated by a pilot of the airplane or by an automatic piloting system of the airplane.

The step E1 is implemented, at least, during a take-off phase of the airplane and/or during a landing phase of the airplane, and the step E2 is implemented, at least, during a cruising flight phase of the airplane.

By changing the configuration of the airplane and the position of the center of gravity during the flight, it thus becomes possible to increase the aerodynamic efficiency of the airplane 1, and to reduce the fuel consumption. Furthermore, the airplane 1, as described above, is able, when it is in the configuration C2, to fly at a higher altitude than the standard maximum cruising flight altitudes.

The airplane 1, as described above, offers many other advantages.

In particular, through the capacity to pivot the tail parts 9 and 10:

the lift surface area of the airplane 1 can be augmented, for example by approximately 10%, with a low mass penalty due to the fuel transfer system 14 and to the pivoting system 15;

a reduction of the fuel consumption is obtained. In cruising flight, the rear tail unit 7 generates, in fact, using the tail parts 11 and 12 and the tail ends 9 and 10, a lift force, and the airplane can fly at a higher altitude;

for one and the same altitude and one and the same speed, the overall drag is reduced because of the reduction of the overall lift coefficient on the lift surface area, which makes it possible to save on fuel;

the augmenting of surface area through the deployment of the tail parts 9 and 10 makes it possible to fly at a higher altitude, without increasing power and without increasing the surface area of the main wing formed by the wings 3 and 4 (and therefore without increasing mass);

the tail parts 9 and 10 (forming, in folded position, a rear vertical tail) become a lift surface when they are deployed during the cruising flight phase; and the complete rear tail unit 7 becoming a lift surface and not a surface applying a downward force can be a laminar surface.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An airplane comprising:
   a fuselage with a longitudinal axis,
   at least two wings,
   engines,
   a rear tail unit comprising a horizontal tail provided with two tail ends, and
   at least one first set of fuel tanks,
   at least one second set of fuel tanks, offset relative to said at least one first set of fuel tanks at least along the longitudinal axis, and
   at least one fuel transfer system configured to transfer, at least in flight, fuel from one to the other of said at least one first set of fuel tanks and said at least one second sets of fuel tanks, and wherein said tail ends are pivotably mounted so as to be able to be pivoted, at least in flight, relative to said horizontal tail.

2. An airplane according to claim 1, said airplane having a center of gravity and a center of lift,
   wherein the at least one fuel transfer system is controllable and is configured to be able to bring, at least in flight, fuel from one to the other of said at least one first set of fuel tanks and at least one second set of fuel tanks in order to obtain, alternately, one or another of two filling states:
   a first filling state, in which the center of gravity of the airplane is situated towards the front of the airplane relative to the center of lift; and
   a second filling state, in which the center of gravity of the airplane is situated towards the rear of the airplane relative to the center of lift.

3. The airplane according to claim 1, further comprising at least one controllable pivoting mechanism configured to be able to bring each of the two tail ends, at least in flight, alternately into one or other of two stable positions:
   a first folded position in which the two tail ends are arranged substantially orthogonally to a general plane of said horizontal tail so as to form a vertical tail; and
   a second deployed position in which the two tail ends are arranged substantially in a general plane of said horizontal tail so as to form, with the horizontal tail an augmented horizontal tail surface.

4. The airplane according to claim 2, wherein the at least one fuel transfer system comprises at least one pumping device.

5. The airplane according to claim 1, wherein said at least one first set of fuel tanks comprises:
   at least one fuel tank arranged in one of said wings of the airplane; and
   at least one fuel tank arranged in the other of said wings of the airplane.

6. The airplane according to claim 1, wherein said at least one first set of fuel tanks comprises at least one fuel tank arranged in the fuselage of the airplane, longitudinally at a root of the wings on the fuselage.

7. The airplane according to claim 1, wherein said horizontal tail comprises two tail parts arranged on either side of a vertical axis of symmetry of the airplane, and wherein said second set of fuel tanks comprises:
   at least one fuel tank arranged in one of said tail parts of the horizontal tail; and
   at least one fuel tank arranged in another of said tail parts of the horizontal tail.

8. The airplane according to claim 1, wherein said at least one second set of fuel tanks comprises at least one tank arranged in the fuselage of the airplane, longitudinally at a front end of the rear tail unit of the airplane.

9. A method for modifying in flight a configuration of an airplane, said airplane comprising at least a fuselage, two wings, at least two engines, a rear tail unit comprising a horizontal tail provided with two tail ends, and at least first and second sets of fuel tanks, and at least one fuel transfer system configured to be able to transfer fuel from one to the other of said at least one first and second sets of fuel tanks, said tail ends being mounted so as to be able to be pivoted relative to said horizontal tail, comprising:
   at least a first step comprising transferring fuel to bring said at least one first and second sets of fuel tanks into a first filling state in which a center of gravity of the airplane is situated towards a front of the airplane relative to a center of lift, and bringing said tail ends into a folded position in which said tail ends are arranged substantially orthogonally to a general plane of said horizontal tail; and
   at least a second step comprising transferring fuel to bring said at least one first and second sets of fuel tanks into a second filling state, in which the center of gravity of the airplane is situated towards the rear of the airplane relative to the center of lift, and bringing said tail ends into a deployed position in which said tail ends are arranged substantially in the general plane of said horizontal tail,
   said first and second steps being implemented alternately at least during a flight of the airplane.

10. The method according to claim 9, wherein said first step is implemented at least one of during a take-off phase of the airplane or during a landing phase of the airplane, and wherein said second step is implemented during a cruising flight phase of the airplane.

\* \* \* \* \*